United States Patent [19]
Bound et al.

[11] 3,806,908
[45] Apr. 23, 1974

[54] PERIMETER INTRUSION DETECTION SYSTEM

[75] Inventors: Lloyd R. Bound, Carrollton; Alfred C. Hunting, Dallas, both of Tex.

[73] Assignee: Texas Instruments Incorporated, Dallas, Tex.

[22] Filed: Mar. 23, 1972

[21] Appl. No.: 237,423

[52] U.S. Cl. ............................ 340/261, 340/258 R
[51] Int. Cl. ............................................ G08b 13/00
[58] Field of Search .............. 340/261, 272, 258 R; 310/8.1, 9.1

[56] References Cited
UNITED STATES PATENTS

| | | | |
|---|---|---|---|
| 3,717,864 | 2/1973 | Cook et al. | 340/258 R |
| 3,719,891 | 3/1973 | Lee | 340/258 R |
| 3,691,549 | 9/1972 | Wilson | 340/261 |
| 3,109,165 | 10/1963 | Bagno | 340/261 |
| 3,613,061 | 10/1971 | Lund | 340/261 |
| 3,705,401 | 12/1972 | Scott | 340/261 |
| 2,788,513 | 4/1957 | Howes | 310/9.1 |

Primary Examiner—John N. Caldwell
Assistant Examiner—Glen R. Swann, III

[57] ABSTRACT

A perimeter surveillance system is described for sensing intrusions into a specified area. The system includes a cable buried beneath the surface of the earth and along the perimeter of the area to be protected. Associated with the cable are a plurality of transducers electrically connected thereto and also buried beneath the surface of the earth. These transducers may be, for example, piezoelectric elements sensitive to soil stress in substantially one direction only and may be mounted in an arrowhead-shaped housing for ease of installation. Each piezoelectric transducer is connected to the buried cable with its polarity opposite to that of its nearest neighbors in order to cancel out undesired noise from remote sources. The transducers themselves are capable of broad-band response, from just above d.c. to several kHz. In one embodiment, the response of the total system is limited to sub-seismic frequencies, so that the system is not sensitive to seismic-band signals caused by wind, rain, hail, distant vehicular traffic, vibrating mechinery and other remote natural and man-made disturbances.

10 Claims, 17 Drawing Figures

A. SIGNATURE OF STEALTHY TRAVERSE AT 1 METER OFFSET
TARGET: 180 POUNDS

B. RESPONSE OF SINGLE TRANSDUCER TO SIMULATION OF VERY STRONG WIND SHAKING CHAIN-LINK FENCE 25 FEET FROM TRANSDUCER

PERIMETER INTRUSION DETECTION SYSTEM

BACKGROUND OF THE INVENTION

1. Field of the Invention

This invention relates to intrusion detection and more particularly to a perimeter intrusion detection system for detecting the occurrence of intrusions across the perimeter of a protected area.

2. Description of the Prior Art

Of all the various modes used in the past for sensing the occurrence of an intrusion in an outdoor environment, only a very few have been able to provide a high degree of localization for coverage of a long narrow corridor. Prior art systems utilized, for example, a magnetic sensor, a capacitance line sensor or a balanced pressure sensor. However, the magnetic sensor is appropriate only if the intruder is likely to be carrying ferromagnetic material, and the capacitance line is adversely affected by changes in the conductivity of its environment, such as soil moisture changes. The balanced pressure sensor, comprised of two parallel lines each filled with a liquid and connected to a device which measures the pressure differential between the two lines, is very susceptible to externally induced undesired noise, such as wind.

Accordingly it is an object of the present invention to provide a perimeter intrusion detection system for detecting intruders entering or departing from specified areas.

Another object is to provide a perimeter intrusion detection system which is sensitive to quasi-static soil stress arising from near-field, slowly varying loading on the soil surface.

Another object of the invention is to provide a perimeter intrusion detection system which is very insensitive to undesired noise induced by remote sources.

Another object of this invention is to provide a perimeter intrusion detection system which is insensitive to wind, rain, hail, earthquakes, distant vehicular traffic, vibrating machinery and other remote natural and man-made disturbances.

Another object of this invention is to provide a perimeter intrusion detection system which is completely hidden from the intruder.

Another object of the present invention is to provide a transducer for use with said perimeter intrusion detection system which is sensitive only to soil stress variations and mainly to variations in one particular direction.

Another object is to provide a transducer which is sturdily constructed and which lends itself to a novel and inexpensive method of installation.

A further object is to provide a perimeter intrusion detection system which is easy to install and maintain.

A still further object is to provide a highly-reliable perimeter intrusion detection system which includes no moving parts and a minimum of buried circuitry.

Other objects and features of the invention will become more readily understood from the following detailed description and appended claims when read in conjunction with the accompanying drawings.

DESCRIPTION OF THE PREFERRED EMBODIMENTS

Figure 1:
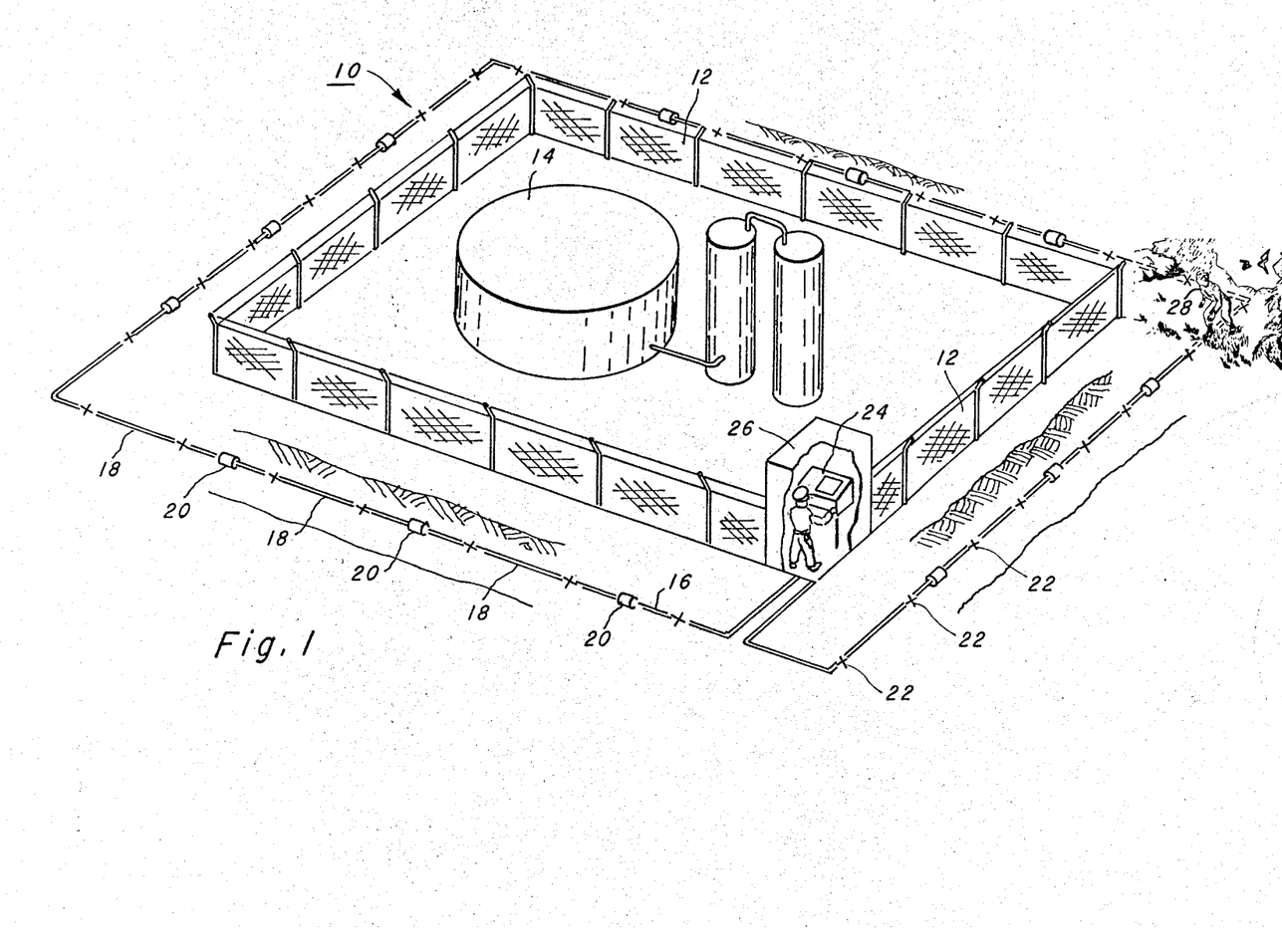
FIG. 1 shows a typical perimeter intrusion detection system, according to the present invention, around the perimeter of a site to be protected.

FIG. 1 shows a typical perimeter intrusion detection system 10 according to the present invention. The system 10 is provided to report intrusions near the fence 12 which surrounds the site 14 to be protected. The system 10 can be designed such that an indicator or alarm is sounded each time a person comes within a predetermined distance to the system, for example 25 feet. It will be noted that while the illustration shows the area surveillance system surrounding the outside of fence 12 to detect intrusions into the site 14, it would also be possible to include a similar system 10 within the confines of fence 12 in order to detect exits from the site 14 as well. The system 10 consists of a buried multiconductor cable 16 composed of a plurality of segments 18 which are interconnected by way of connectors 20. Electrically associated with cable 16 are a plurality of buried soil stress sensors 22. The cable 16 is buried about six inches from the surface of the earth and the trench enclosing cable 16 is back-filled and levelled for minimum visibility. Any intrusion across system 10 will be detected by the minute variations in the stress of the surrounding soil to which sensors 22 are sensitive. These stress variations can be as slow as a man stealthily crawling or tiptoeing over sensors 22 or they can be faster than a man running. In response to any such intrusion, an alarm or other type of indication will be transmitted to alarm display and system control console 24 in monitoring station 26. Station 26 may be remote from the protected area.

Figure 2:
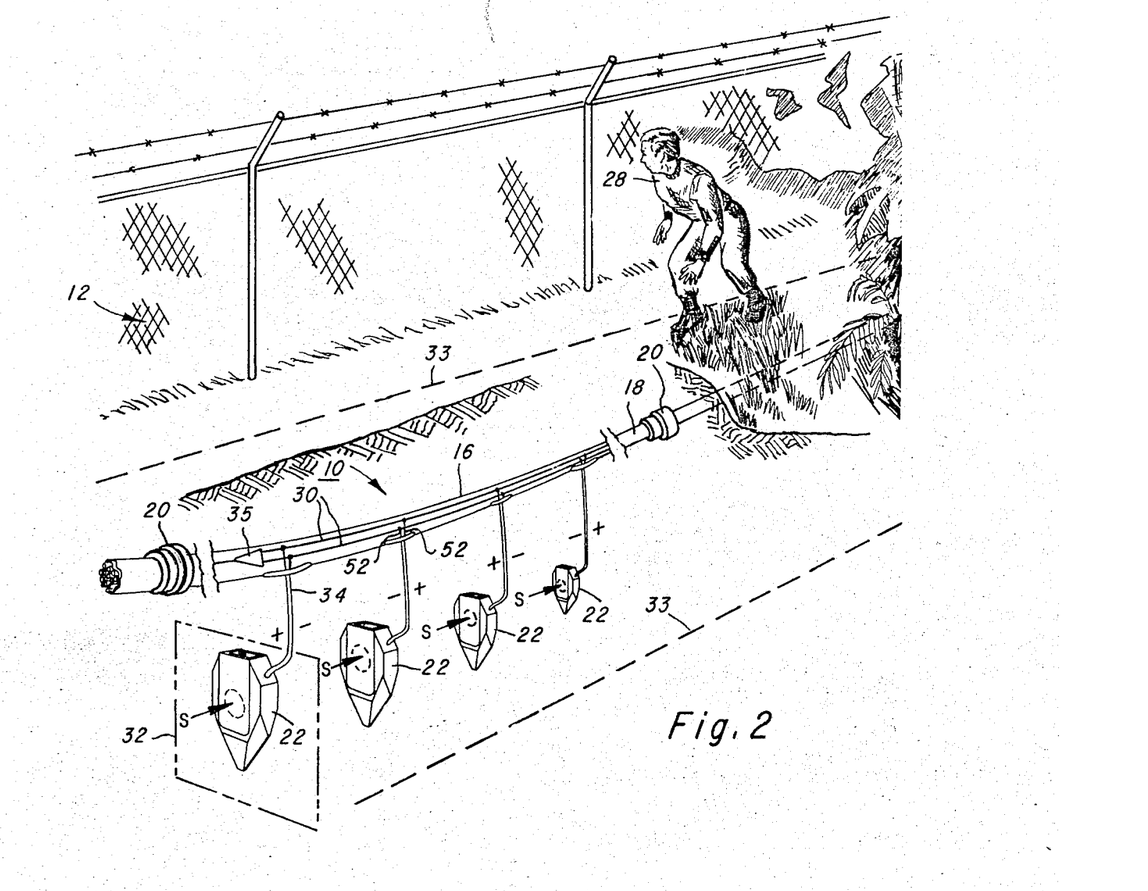
FIG. 2 is a schematic of the installed intrusion detection system according to one embodiment of the present invention.

FIG. 2 is a more detailed schematic of a portion of the perimeter intrusion detection system 10 illustrated in FIG. 1. One segment 18 of cable 16 is illustrated in FIG. 2. Each segment 18 consists of at least one soil stress sensor 22; normally there are a large nuber of such sensors located within one segment. Typically, segment 18 is buried about 6 inches below the surface of the earth, while sensors 22 are located between 6 and 36 inches below the surface of the earth. A typical segment 18 can be as long as several hundred yards or as short as desired, depending upon the resolution within which the intrusion by an intruder, such as human intruder 28, needs to be localized. This enables the system 10 to indicate an intrusion on monitor 24 (FIG. 1) to within any required resolution. Within a resolution element or segment 18, each of the sensors 22 is connected in parallel to a pair of input lines 30. The spacing between sensors is typically 1 meter. The sensors 22 have flat sides terminating in a wedge shaped point and are oriented in a vertical plane 32 perpendicular to cable 16. Sensors 22 are also oriented such that their stress-sensitive faces are all aligned in the same direction indicated by the arrows S. With the sensors 22 deployed in this manner, a lineal configuration is obtained with the snesors 22 sensitive to stress variations along a reltively narrow corridor 33 whose center is over the length of the cable 16. Accordingly, disturbances outside this narrow corridor do not cause alarms, whereas disturbances within this corridor, such as a human intruder 28, will cause an alarm. A typical sensor 22 is connected through leader cable 34 to input lines 30 with a polarity opposite to that of its nearest neighbors. This provides "common-mode" rejection, which means that the system 10 is sensitive to localized sources of soil stress but insensitive to sources of stress that are nearly uniform over large areas, such as wind, rain and other natural and man-made phenomena. This feature will be discussed in more detail later. The output signals from each of the sensors 22 are combined into a composite signal, which is fed into an amplifier 35. This amplifier 35 and associated test circuitry, one for each segment 18, is the only kind of circuitry contained within the buried line. Thus the amount and complexity of the circuitry that is not readily accessible is kept to a minimum.

Figure 3:
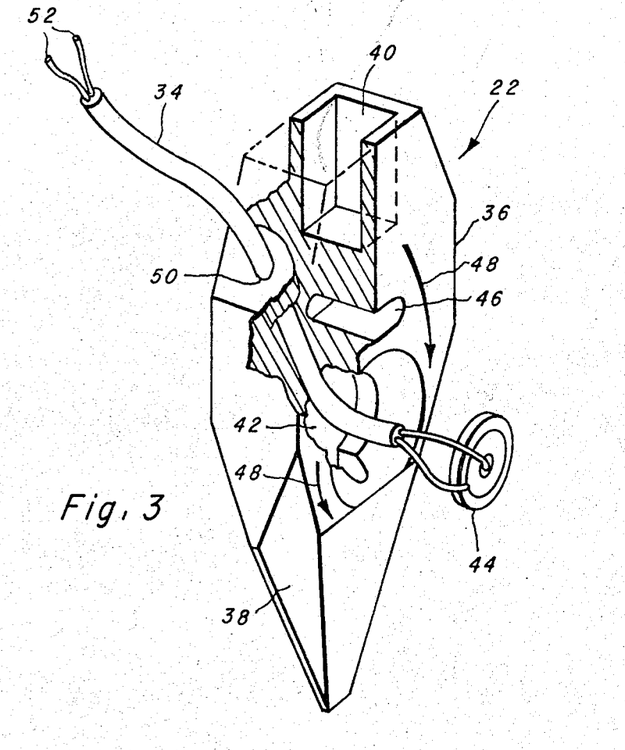
FIG. 3 is an enlarged perspective break away view of the sensor assembly which includes an arrowhead housing with the piezoelectric transducer associated therewith.

FIG. 3 is a more detailed break-away view of the sensor 22 illustrated in FIG. 2. The sensor 22 has a housing 36, which may have the general form of an arrowhead. The housing should be made of a tough durable material and may be molded of a polycarbonate plastic, such as Lexan, which easily withstands the impacts and abrasions of installation, even in a rocky soil. One end of the arrowhead has bevelled edges 38 which form a point; the other end of the arrowhead has a drive socket 40 molded therein. An opening 42 is located approximately at the midpoint of the arrowhead for placement of transducer 44. Opening 42 may be a hole completely through the housing 36, in which case a seating shoulder inside the hole is used to support the back of transducer 44. In FIG. 3 the opening 42 is shown extending only part way into housing 36; accordingly, the back of transducer 44 is seated against the back surface of opening 42. In either case, transducer 44 is sensitive to stress maninly from a single direction. A force-dividing aperture 46 is located between the drive socket 40 and the opening 42. This protects the transducer 44 from undue stresses during installation. When sensor 42 is implanted into the surface of the earth, the force impressed upon the housing will be divided around aperture 46, and accordingly also around transducer 44, as shown by force arrows 48. The hole 50 extends from the side of the housing 36 to the opening 42 in order to accommodate leader cable 34 from cable 16 (FIG. 2). A pair of conductors 52 in leader cable 34 connect transducer 44 to input lines 30 in cable 16 (FIG. 2). With the transducer 44 in place in opening 42 and with the sensitive surface of the transducer facing outward, a suitable material, such as polyurethane, is utilized to fill opening 42. This material serves both to hold the transducer 44 in place and to transfer the soil stress to transducer element 44.

Figure 4A:
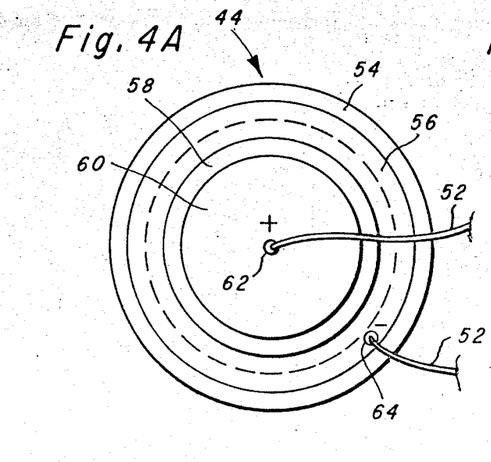
FIGS. 4A and 4B illustrate a more detailed front and cross-sectional side view of the piezoelectric transducer utilized in FIG. 3.
Figure 4B:
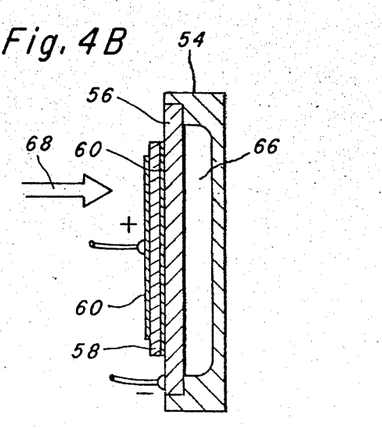

FIGS. 4A and 4B are a front view and a cross-sectional side view of the transducer 44 utilized in the housing 36 (FIG. 3). Transducer 44, in this embodiment, is a piezoelectric type transducer. A variable reluctance transducer or an electrodynamic transducer are examples of other types of transducers that could also be used and which are sensitive to changes in the soil stress.

In FIGS. 4A and 4B, transducer 44 has a transducer support structure 54 for supporting bender plate 56. The support structure 54 is made of plastic, while bender plate 56 is made of brass. A piezoelectric cyrstal disk 58, typically made of an alloy of lead zirconate and lead titanate, has tin-lead coatings 60 formed on both its sides. One side of disk 58 is in turn soldered to bender plate 56. One of the leads 52 in leader cable 34 (FIG. 3) is connected to the positive side formed on the tin-lead coating 60 on the top of the piezoelectric disk 58, while the other conductor 52 is connected to the negative contact 64 formed on bender plate 56. Bender plate 56 provides structural support for the piezoelectric disk 58 and further supplies additional restoring force when the piezoelectric crystal disk 58 is deformed by the soil stress created by an intrusion. The cavity 66 (FIG. 4B) behind bender plate 56 allows the plate and the piezoelectric disk 58 to deform freely in response to stress (shown by arrow 68) applied normal to the front face of transducer 44. The high compliance this gives to the disk and the bender plate provides the equivalent of considerable meachanical advantage in coupling the external stress supplied by the weight of an intruder to the piezoelectric disk 58, thus making possible a relatively high value of transducer sensitity. This form of piezoelectric transducer responds mainly to stress perpendicular to the sensitive surface (such as is illustrated by stress arrow 68).

Figure 5:
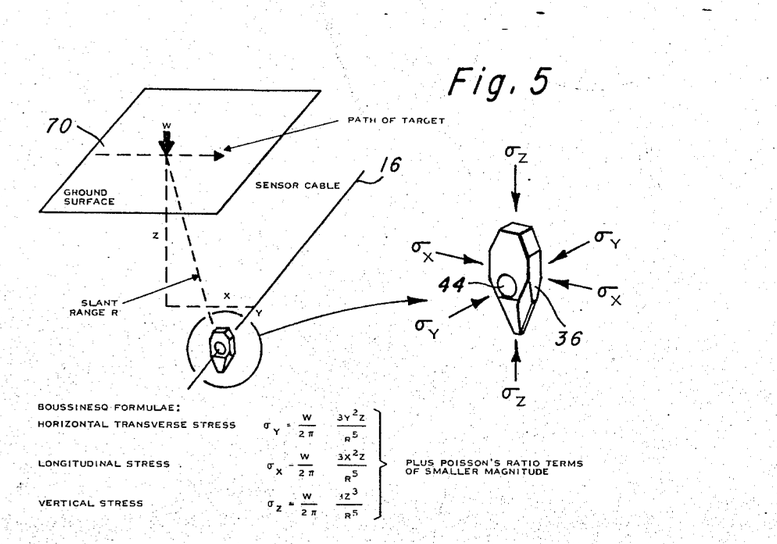
FIG. 5 shows the geometry of the soil stress calculations utilized in conjunction with the transducer illustrated in FIGS. 4A and 4B.

The soil stress sensor (illustrated in detail in FIGS. 4A and 4B) responds almost exclusively to one of the few characteristics the intruder is certain to exhibit, i.e., weight which is supported by the ground surface he is traversing. Accordingly, a sensor, such as transducer 44, is desirable for detecting the occurrence of intrusions across a perimeter around a site to be protected. The frequencies of the soil stress variations that are of interest are quasi-static frequencies, i.e., frequencies which extend from just above dc up to 5 to 10 Hz, just below the range where seismic signals from distant sources become significant. Transducer 44 measures soil stress variations and mainly the soil stress in the direction of the sensor cable 16. All of the transducers 44 (shown more clearly in outline in FIG. 2) have their sensitive surfaces facing in the same direction, which is along the line of the sensor cable 16, so that a narrow corridor 33 (also FIG. 2) is protected. Referring now to FIG. 5, transducer 44 provides a high degree of localization transverse to the line of the sensor cable 16, by virtue of the sharp falloff of soil stress, and thus of transducer response, as the point of application of the intruder's weight W on ground surface 70 moves away from the ground-zero point of the transducer 44. The geometry of this configuration is shown in this FIG. 5. Here the origin of the coordinate system is the point of application of the surface loading. The Boussinesq formulas for the soil stresses induced by a point load on the surface 70 illustrated in FIG. 5 were derived on the basis that soil is an isotropic elastic medium and that the weight of the soil itself can be disregarded in comparison with externally applied forces, such as the weight W of an intruder. It should be noted that the stress $\sigma_y$ (denoted in the formulae) in the direction of the sensor cable 16 theoretically should go to zero when the weight load is located directly above transducer 44. However, inclusion of soil compressibility effects, by way of the Poisson's-ratio terms, transforms the zero region from the x-axis to a nearly elliptical curve centered around the x-axis. The results of field testing show the absence of a zero or even a deep minimum in the vicinity of the ground zero point (i.e., directly above transducer 44). This is attributed to inhomogeneities in the intervening soil medium and to the spreading of the stress distribution patterns because of the finite surface area 70 on which the weight W is applied.

Figure 6:
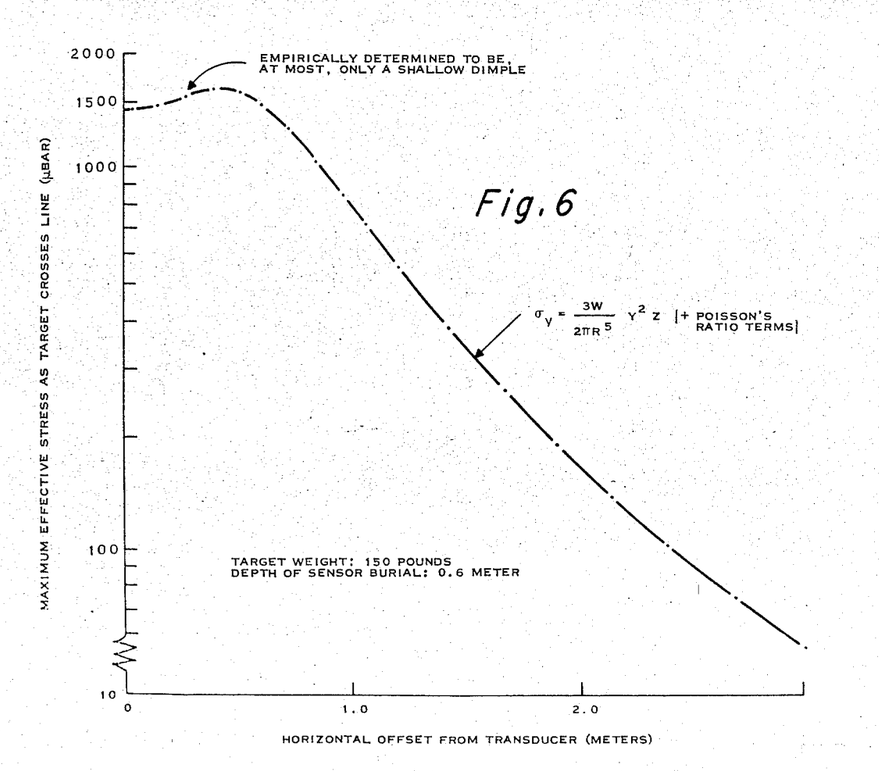
FIG. 6 is a graph which illustrates the calculated peak soil stress at a single transducer for intruder traverses with various offsets from the buried transducer.

FIG. 6 shows calculated values of the peak stress, in microbars, at transducer 44 when the traversing target, such as intruder 28 (FIG. 2), is directly above the cable 16 and at various offsets from the transducer 44. FIG. 6 shows that as the offset of the intrusion path from the sensor 22 increases, the stress exerted perpendicular to sensor 22 drops off. Since the narrow corridor 33 (FIG. 2) extends on both sides of system 10, a typical corridor of sensitivity would be about 4 to 6 meters wide, i.e., 2 to 3 meters on either side of cable 16.

Figures 7A, 7B, 7C, 7D:
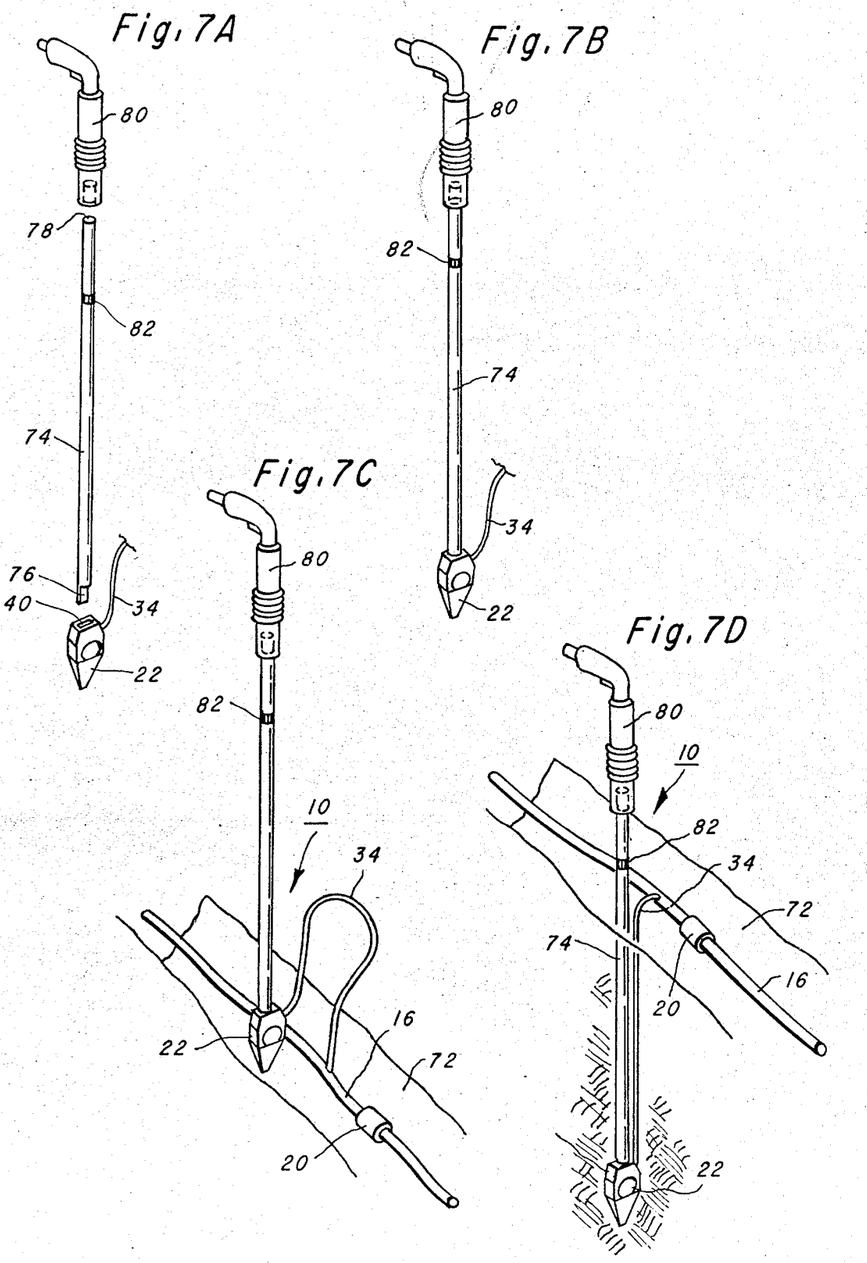
FIGS. 7A–7D illustrate the various steps in implanting the sensor assembly shown in FIG. 3.

FIGS. 7A–7D illustrate a novel method of installation of the sensor shown in FIG. 3. A narrow trench 72, roughly 6 inches by 6 inches, is dug with a trencher (not shown) along the line where the perimeter intrusion detection system 10 is to be placed (see FIG. 7C). The main connecting cable 16, with arrowhead shaped sensors 22 attached to leader cables 34, is laid out in trench 72. In FIG. 7A, implanting shaft 74 has one end 76 which mates with drive socket 40 located in the top of sensor 22. The other end 78 of implanting rod 74 mates with a driving mechanism 80, such as an air hammer. FIG. 7B shows sensor 22, implanting rod 74 and air hammer 80 interconnected in their proper relationship. In FIG. 7C, the sensor 22 is shown ready to be implanted with air hammer 80 into the soil at the bottom of trench 72. A depth indicator, such as strip 82 on implanting rod 74, denotes the proper depth to which sensor 22 is to be driven. FIG. 7D shows sensor 22 driven into the soil to the depth indicated by stripe 82 on implanting rod 74. The depth of implantation is typically 20 inches and a typical spacing between sensors 22 is about 40 inches. Each of the arrowhead shaped sensors 22 should be oriented properly with the flat sides of said sensor oriented in a vertical plane (such as plane 32 in FIG. 2) perpendicular to cable 16. If in some cases the soil is too rocky for the arrowhead sensor 22 to find any paths straight down, then a jack hammer may be utilized to open a vertical hole through the rocky layers almost to the required depth for implantation. The arrowhead sensor is then driven in an additional 3 to 5 inches in the manner illustrated in FIGS. 7A–7D, so that the sensitive surface of the transducer is firmly embedded in undisturbed soil. After the arrowhead sensors have all been implanted, shallow trench 72 is refilled and the soil surface leveled and smoothed for minimum visibility.

A particular advantage of the method of installation illustrated in FIGS. 7A–7D is that when the arrowhead sensor 22 is driven straight down into previously undisturbed soil and both its side surfaces become tightly embedded into the soil, there is little possibility for the formation of a loose interface with the soil around it. Loose interfaces can occur with other modes of implantation in the soil; in such cases, the sensitive surface of the transducer can become decoupled from the soil medium and thereby lose sensitivity, especially to low-amplitude signals.

Because transducer 44 can sense only low-frequency soil stresses, false alarms can arise only from sources that can exert stress directly on the transducer face by loading the soil nearby, either at the soil surface or at a subsurface interface. The only such source of importance that has pressure levels and frequencies of variation that resemble intrusions is strong gusts of wind. These are coupled to the soil around the transducer both directly, by a fluctuating pressure on the soil surface, and indirectly, by wind-induced vibrations in nearby trees and above-ground structures, which exert forces and torques on soil interfaces near the transducer. According to the present invention, an effective way of dealing with wind-induced noise is to make use of the main difference between actual intrusions and the effects of the wind, i.e., localization. The direct loading of the ground surface by wind gusts is spread over an area much larger than the spacing between the transducers. Similarly, if a structure whose foundation is coupling the wind gusts into the soil is much farther from the system 10 than the spacing between transducers 44, then the strength and direction of these stresses at any given instant will be nearly the same at neighboring transducers. Accordingly, as shown in FIG. 2 and described with FIG. 8, transducers 44 utilize common-mode rejection, in which each transducer 44 is connected to its common input line 30 (FIG. 2) with a polarity opposite to that of its nearest neighbors. Thus, if an external perturbation has essentially the same amplitude and phase at several neighboring transducers 44, it will produce essentially no net signal at amplifier 35 (FIG. 2).

Figure 8:
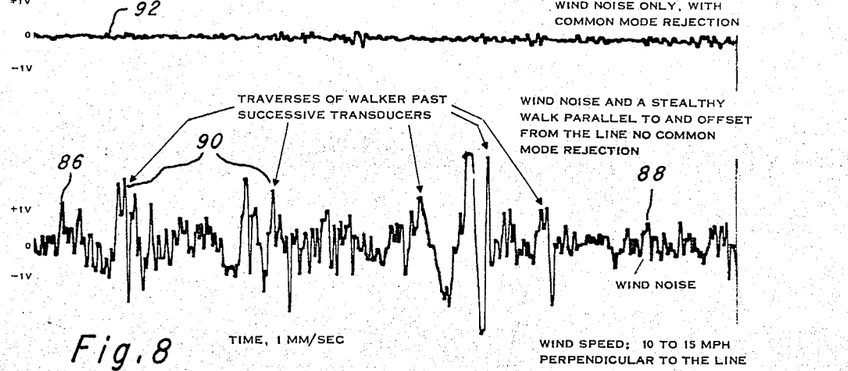
FIG. 8 illustrates typical wind noise effects on the waveforms generated in the perimeter intrusion detection system both with and without common mode rejection.

Referring now to FIG. 8, the effect of common-mode rejection in reducing the effect of wind noise and other perturbations can be seen by comparing the signals obtained in an actual test environment. Two adjoining segments of cable were used. In one length, transducers 44 were all connected with the same polarity; in the other, transducers 44 were connected with alternating polarities for common-mode rejection. In FIG. 8, waveform 86 is the signal obtained with no common-mode rejection and the wind noise at point 88 can be seen;

peaks 90 represent intruder traverses past successive transducers 44. Waveform 92 is the output signal from transducers 44 with common-mode rejection. Wind noise is the only perturbing source here; there are no intruder signals present. Waveforms 88 and 92 show that the wind noise is reduced by almost an order of magnitude by the use of common-mode rejection. These data were taken with lines in which the transducer spacing was 4 meters. With 1 meter spacing, a signal-to-noise ratio in the order of 30:1 or higher is achievable, even in the presence of 20 to 30 mph winds.

It might be expected that the reversal of polarity for each successive transducer would give rise to a line of zero net sensitivity on the ground surface half way between each successive pair of transducers. Field tests have been conducted in which traverses were made at closely spaced offsets progressing from one transducer toward its neighbor. In these tests, the main interest was in the general shape of the rise and fall of the signal level as the walker or intruder crossed the line, and in the variation of the maximum amplitude of the signal as the traverses approached the point midway between transducers. These tests showed that the maximum amplitudes generally followed the calculated stress curve shown in FIG. 6 with a relatively smooth transition at the midpoint. The absence of a zero or a deep minimum is atrributed to inhomogeneities in the soil and to irregularities in the footprint loading pattern.

Figure 9:
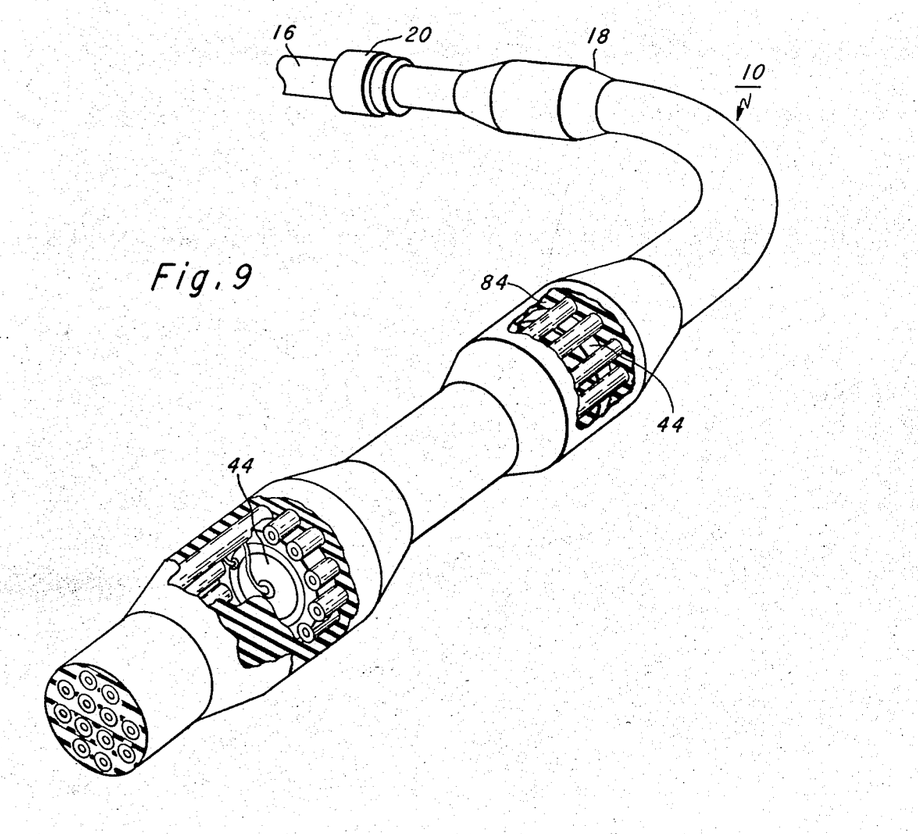
FIG. 9 illustrates another embodiment of the perimeter intrusion detection system according to the present invention.

FIG. 9 illustrates another embodiment of the perimeter intrusion detection system 10 illustrated in FIG. 1. For simplicity, the reference numbers used in FIG. 9 are the same as for the corresponding items in the first embodiment of FIG. 1. In FIG. 9, the perimeter surveillance system 10 consists of a lineal array of transducers, such as, for example, the piezoelectric transducers 44 illustrated in FIGS. 4A and 4B. Around these, a common jacket 84 is extruded forming a single flexible cable 16. This is buried along the perimeter of the site to be protected. Basic resolution elements or segments 18 are connected in series, through connectors 20, with other identical segments to form a continuous perimeter intrusion detection system such as is described with reference to FIG. 2. The transducers 44 are typically evenly spaced within the cable jacket 84. Signal conditioning circuitry (not shown, but similar to amplifier 35 in FIG. 2) is located at the end of each segment 18. The jacket 84 may be made of polyurethane or other similar material. The polyurethane jacket 84 should be in intimate contact with each of the transducers 44, in order to insure that the transducers 44 are in intimate mechanical contact with the soil around the cables. Otherwise, the sensitive surface of the transducer can become decoupled from the soil medium and thereby lose sensitivity to low amplitude signals. As in the system shown in FIG. 2, the embodiment shown in FIG. 9 has the sensitive surface of the transducer 44 perpendicular to the line of cable 16. Similarly, common-mode rejection is provided by having each of the transducers 44 connected to a common input line (not shown) with a polarity opposite to that of its nearest neighbors. This approach allows the system to reject noise produced by large-area and by remote sources, such as wind, rain, distant vehicular traffic and vibrating machinery.

Figure 10A:
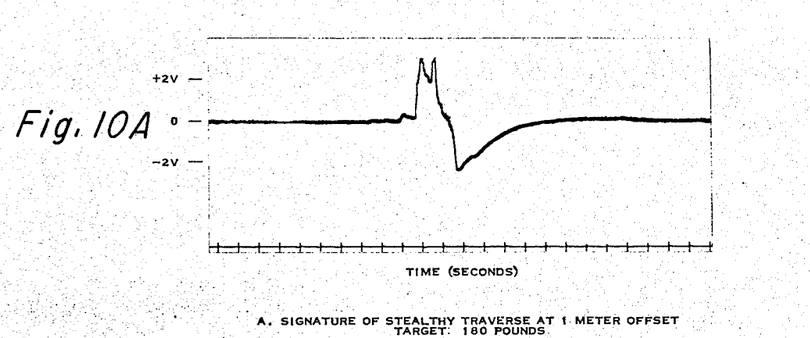
FIGS. 10A and B illustrate the waveforms obtained with a sensor according to the present invention when buried below a paved surface and when a strong wind shakes a nearby fence.

The concepts utilized in the perimeter intrusion detection system according to the present invention are equally applicable under an area having a paved surface. The theory of soil stresses indicates that the stress due to a weight load on a paved surface should be different from the unpaved case only to the extent that the paved surface is stiffer than the soil beneath it and tends to spread out the distribution of the load on the surface. Accordingly, the signature or waveform of a traverse on a paved surface is nearly the same as on a soil surface. FIG. 10A shows the signal produced by a stealthy traverse of an intruder at an offset of one meter. The transducer was embedded about 8 inches into the soil beneath a 4-inch thick surface layer of asphalt paving. The signature shown in FIG. 10A confirms the similarity to the unpaved case.

Figure 10B:
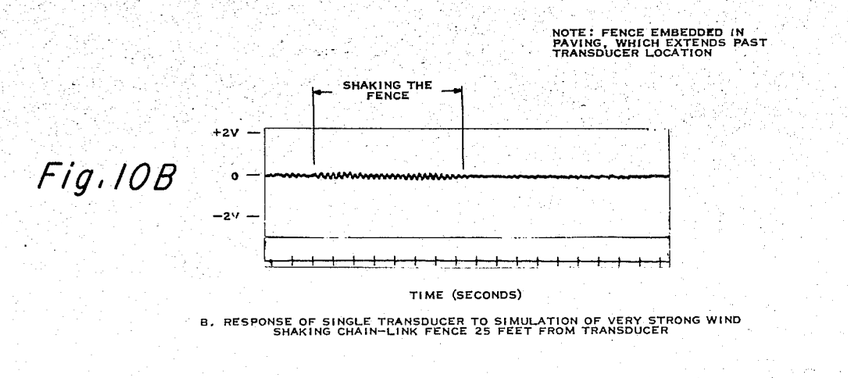

It is also of concern whether a paved surface will transmit soil stresses from distant wind-shaken structures, such as fence 12 (FIG. 1 and 2), differently than does uncovered soil. A simulation was made of the effect of the wind by manually shaking a chain-link fence located 25 feet from the transducer. This fence was anchored through the paved surface which extends to and beyond the transducer. The relatively low amplitude of the transducer output, as shown in FIG. 10B, indicates that wind-induced noise from this source is not a significant problem.

Figure 11:
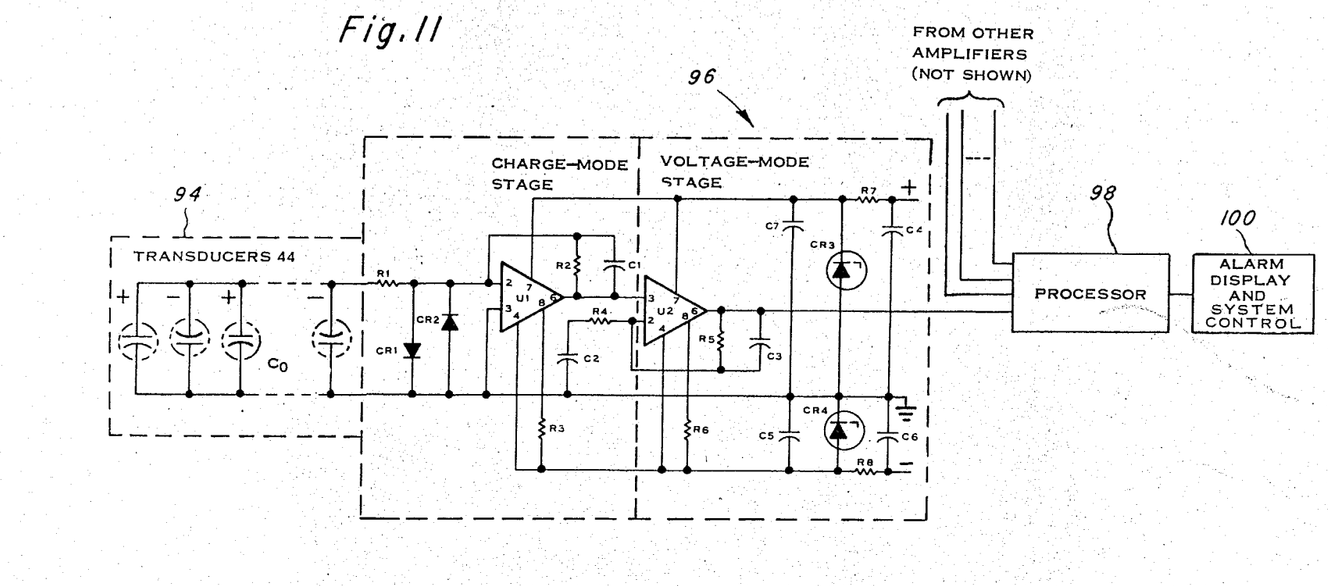
FIG. 11 illustrates the schematic for the electronics used with each segment of the perimeter intrusion detection system.

FIG. 11 shows the circuitry utilized with a typical segment of the perimeter surveillance system according to the present invention. The circuitry consists of input section 94, a two-stage amplifier 96, a processor 98 and a display and/or alarm system 100. In FIG. 2, all the transducers 44 in a segment 18 of cable 16 are connected in parallel to output lines 30. FIG. 11 shows the successive transducers 44 in input section 94 connected with alternating polarity, to provide the common-mode rejection feature previously described.

Amplifier 96 has two stages, a charge-amplifier stage and a voltage-gain stage. The output signal from the charge amplifier stage has an amplitude which is proportional to the displacement of charge in the input circuit and is essentially independent of the value of the capacitance in parallel with the input. Here the displacement of charge is produced by transducers 44 in response to variations in the soil stress caused by the intruder 28. The charge amplifier stage features a low input impedance and an immunity to the effects of stray capacitance in the input circuit. The principle of operation of the charge amplifier stage is similar to that of a conventional operational amplifier. The main difference is that at the input terminal pin 2 of operational amplifier U1, the input charge from the transducers 44 in input section 94 is balanced by the charge on capacitor C1 that is fed back from the output of the amplifier. Feedback resistor R2 provides dc rolloff, so the amplifier does not appear as an open-loop integrator. Resistor R1 is determined by the required high-frequency cut-off. The low-frequency and high-frequency 3-db points $f_L$ and $f_H$ are given by:

$f_L = 1/R_2 C_1; f_H = 1/R_1 C_o$ where $C_o$ is the value of the transducer capacitance and $C_1$ is the value of the feedback capacitance. The midband gain $k$ of the charge amplifier stage is determined by $k = C_1/C_o$ The transfer function for the charge amplifier stage is $E_o(S)/E_1(S) = C_1/C_o \cdot [S/(S + 1/R_2 C_1)] \cdot [(1/R_1 C_o)/(S + 1/R_1 C_o)]$ $f_H$ is in the sub-seismic frequency range, typically less than 10 Hz. This keeps the perimeter surveillance system relatively insensitive to noise sources in the seismic frequency range. The system is sensitive only to stress variations in the sub-seismic range, typically between 0.01 to 10.0 Hz. These stress variations are due almost entirely to the quasi-static soil pressure arising from the near-field, slowly-varying loading on the soil surface. The low-pass filtering provided by the charge amplifier stage could be provided by a separate filter located after amplifier 96.

The second stage of amplifier 96 is a conventional voltage gain stage. The output of this stage is fed to processor 98, along with the outputs from similar amplifiers in other segments (not shown) of the cable.

Typical values for the electronic components of the two-stage amplifier 96 are as follows:

| R1 | 5kΩ | C4 | 22 μF |
|---|---|---|---|
| R2 | 80MΩ | C5 | .01 μF |
| R3 | 10MΩ | C6 | 22 μF |
| R4 | 100kΩ | C7 | .01 μF |
| R5 | 10MΩ | CR1 | 1N914 |
| R6 | 10MΩ | CR2 | 1N914 |
| R7 | 100Ω | CR3 | 6.2V Zener |
| R8 | 100Ω | CR4 | 6.2V Zener |
| C1 | .047 μF | U1 | UC4250C |
| C2 | 33 pF | U2 | UC4250C |
| C3 | 16 pF | | |

The processor 98 may be as simple as a threshold detector circuit or as complex as a digital computer, such as the Model 960A computer manufactured and sold by Texas Instruments Incorporated. The processor 98 operates on the data supplied it by the various amplifiers in the perimeter surveillance system. It sends an output signal to the alarm display and system control 100 when an intrusion has occurred.

System 100 may include one or more of the following features: (1) a device for providing a permanent printed plain-language record of all alarms, control functions, and operator actions; (2) a control center by which any or all segments of the intrusion detection system can be put into an alarm or an inhibit mode of operation; and (3) one or more map displays to give an indication of the number and location of all intrusions across the monitored corridor. This display will also show which segments are currently in the inhibit mode. The map display may be a large areas wall mount unit, and/or a smaller console unit, such as console 24 in FIG. 1; either or both types of displays can be remotely located from the monitored corridor.

Figure 12:
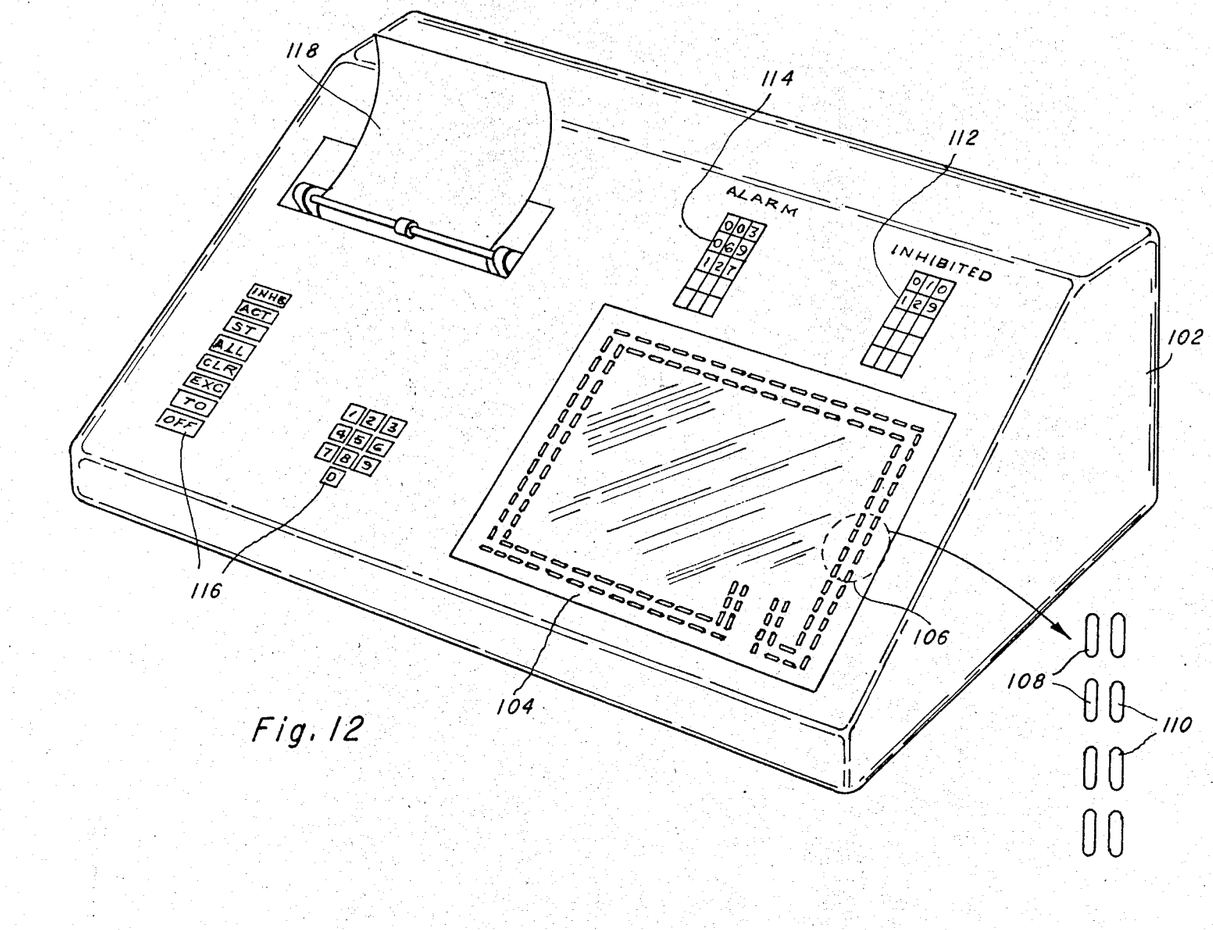
FIG. 12 illustrates a typical alarm display and system control console for the perimeter intrusion detection system.

Referring to FIG. 12, a typical display and control console 102 is shown in more detail. Console 102 could be utilized with the system illustrated in FIG. 1. The lighted map display portion 104 of the console consists of a map overlap of the site to be protected (in this instance the outer perimeter of fence 12, see FIG. 1) and further provides a visual status indication for each resolution element or segment 18 (FIG. 2). An exploded view of insert 106 shows a possible configuration of columns of indicator lamps 108 and 110 which may denote an inhibit mode condition and an alarm condition, respectively, for each resolution element along the site to be protected. The inner column of indicator lamps 108 may be yellow lines of light which indicate a resolution element is in the inhibit mode along with a numeric readout device 112 which indicates the number of the segment which has been placed in this mode. A flashing red line of light from one or more indicator lamps 110 and a similar numerical readout from alarm numeric readout device 114 would indicate that an intrusion had taken place within corridor 33 in one or more segments 18 (FIG. 2).

Console 102 may also include control keyboards 116 and a teleprinter 118 to record all alarms, control functions and operator actions. As previously mentioned, lighted numeric displays 112 and 114 denote the identification numbers of the resolution elements or segments that are in an inhibited (i.e., access) condition or that are in an alarm condition. Some of the control keyboard instructions on keyboards 116 that can be utilized in controlling the perimeter surveillance system are listed below:

| KEY | OPERATION |
|---|---|
| INHB | Tells the processor to inhibit the element or elements indicated by the numbers entered, following the INHB command. |
| ACT | Tells the processor to activate the resolution elements(s) indicated by the numbers entered following the ACT command. An automatic self-test may be provided to test each resolution element after it is reactivated. |
| ST | Tells the processor to self-test the element or elements indicated by the numbers pressed, following the ST command. |
| ALL | Causes the preceding command to be performed on all segments of the system. |
| CLR | Cancels an improper command. |
| EXC | Tells the processor to execute a command. |
| TO | Tells the processor to operate on all elements between two element numbers inserted. |
| OFF | Turns off the alarm of the specified resolution element(s). |

It will be appreciated that although the perimeter intrusion detection system 10 shown in FIG. 1 completely surrounds the site to be protected, the principles involved in this system are applicable to one segment of the cable with but one sensor therein and that the system 10 may take any geometrical configuration, such as a line, rectangle, etc.

Although the present invention has been shown and illustrated in connection with certain specific embodiments thereof, it is to be understood that further modifications may now suggest themselves to those skilled in the art and it is intended that this invention shall include such modifications as come within the scope of the appended claims.

What is claimed is:

1. A perimeter intrusion detection system for sensing intrusions across the perimeter of a specified area comprising:
   a. at least one segment of an electrical cable, that is to be buried beneath the surface of the earth along the perimeter of the specified area, for conducting electrical signals;
   b. at least one soil stress sensor to be buried beneath the surface of the earth in close mechanical contact with the earth;
   c. a leader cable electrically interconnecting said at least one soil stress sensor to said at least one segment of the electrical cable;
   d. circuit means including bandpass filter means coupled to the at least one soil stress sensor for passing only the sub-seismic frequency signals from said at least one soil stress sensor; and
   e. an indicator means operatively responsive to the circuit means output for indicating the presence of the sub-seismic frequency signals.

2. A perimeter intrusion detection system according to claim 1, wherein circuit means is operative between frequencies 0.01 Hz and 10 Hz.

3. A perimeter intrusion detection system according to claim 1, wherein the indicator means includes a processor electrically coupled to the output of said circuit means.

4. A perimeter intrusion detection system according to claim 3, wherein said processor is a digital computer.

5. The system of claim 1 wherein said at least one sensor is a piezoelectric transducer.

6. The system of claim 1 further including a plurality of sensors wherein said sensors are to be implanted below the surface of the earth at substantially equal depths with all said sensors facing the same direction along said cable.

7. The system of claim 1 wherein said at least one sensor is oriented in a vertical plane perpendicular to said cable.

8. The system of claim 3 wherein the output from said processor is electrically interconnectd with an alarm display.

9. A perimeter intrusion detection system for sensing intrusions across the perimeter of a specified area comprising:
   a. an electrical cable, that is to be buried beneath the surface of the earth along the perimeter of the specified area, for conducting electrical signals;
   b. a soil stress sensor, that is to be buried beneath the surface of the earth in close mechanical contact with the earth, electrically interconnected with the electrical cable, said soil stress sensor operatively responsive to pressure forces to produce electrical representations thereof;
   c. circuit means including a bandpass filter coupled to the soil stress sensor for passing only the subseismic frequency signals from said soil stress sensor; and
   d. an indicator means operatively responsive to the circuit means output for indicating the presence of the subseismic frequency signals.

10. A perimeter intrusion detection system according to claim 9, further including a leader cable interconnecting said soil stress sensor to the electrical cable.

* * * * *